United States Patent
Yeh

(10) Patent No.: US 8,416,277 B2
(45) Date of Patent: Apr. 9, 2013

(54) FACE DETECTION AS A METRIC TO STABILIZE VIDEO DURING VIDEO CHAT SESSION

(75) Inventor: Michael V. Yeh, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 625 days.

(21) Appl. No.: 12/634,927

(22) Filed: Dec. 10, 2009

(65) Prior Publication Data

US 2011/0141219 A1 Jun. 16, 2011

(51) Int. Cl.
*H04N 7/14* (2006.01)
*G06F 15/16* (2006.01)
*G06K 9/00* (2006.01)

(52) U.S. Cl. ............... 348/14.02; 348/14.08; 348/14.06; 348/208.7; 348/333.12; 348/376; 370/352; 375/240.16; 382/103; 382/118; 382/159; 382/167; 382/199; 707/749; 709/227; 715/730; 715/772

(58) Field of Classification Search ............... 348/14.02, 348/14.08, 14.16, 43, 208.7, 208.99, 376; 348/222.1, 333.12; 370/352; 375/240.16; 382/103, 118, 108, 115, 159, 162, 167, 199; 709/227; 715/772, 730; 707/749
See application file for complete search history.

(56) References Cited

U.S. PATENT DOCUMENTS

| | | | |
|---|---|---|---|
| 5,642,431 A * | 6/1997 | Poggio et al. ................. | 382/118 |
| 6,560,375 B1 | 5/2003 | Hathaway et al. | |
| 6,680,745 B2 * | 1/2004 | Center et al. ................ | 348/14.16 |
| 6,789,897 B2 | 9/2004 | Smith | |
| 6,940,545 B1 * | 9/2005 | Ray et al. .................... | 348/222.1 |
| 7,155,058 B2 * | 12/2006 | Gaubatz et al. ............... | 382/167 |
| 7,221,780 B1 * | 5/2007 | Wang ............................ | 382/118 |
| 7,783,075 B2 * | 8/2010 | Zhang et al. .................. | 382/103 |
| 7,880,769 B2 * | 2/2011 | Qi ............................ | 348/208.99 |
| 7,903,166 B2 * | 3/2011 | Daly ........................ | 348/333.12 |
| 7,903,171 B2 * | 3/2011 | Takabatake et al. .......... | 348/376 |
| 7,908,558 B2 * | 3/2011 | Obrador et al. ............... | 715/730 |
| 8,050,463 B2 * | 11/2011 | Hamza .......................... | 382/115 |
| 8,064,688 B2 * | 11/2011 | Schneiderman .............. | 382/159 |

(Continued)

FOREIGN PATENT DOCUMENTS

CN 101668114 A 3/2010

OTHER PUBLICATIONS

Paschalakis, Stavros , et al., "Real-time face detection and tracking for mobile videoconferencing", *Real-Time Imaging*, Academic Press, v. 10, n. 2, (Apr. 2004), pp. 81-94.

(Continued)

*Primary Examiner* — Gerald Gauthier
(74) *Attorney, Agent, or Firm* — Kenyon & Kenyon LLP

(57) ABSTRACT

A handheld communication device is used to capture a video and stabilize the video during a video chat session. The device has a camera to capture a video during a video chat session that is conducted between a user of the device and a far-end user. The video includes images frames, each of the image frames containing an image of a face of the user. The device detects the position of the face in each image frame. Based on the detected position of the face, a boundary area of each image frame is cropped to produce an output video while the video is being captured. The image of the face stays substantially stationary in the output video. The output video is transmitted to the far-end user during the video chat session. Other embodiments are also described and claimed.

20 Claims, 6 Drawing Sheets

U.S. PATENT DOCUMENTS

| | | | |
|---|---|---|---|
| 8,117,210 B2 * | 2/2012 | Cerosaletti et al. | 707/749 |
| 8,155,399 B2 * | 4/2012 | Liu et al. | 382/118 |
| 8,170,332 B2 * | 5/2012 | Wang et al. | 382/162 |
| 8,180,112 B2 * | 5/2012 | Kurtz et al. | 382/108 |
| 8,208,694 B2 * | 6/2012 | Jelonek et al. | 382/118 |
| 8,265,351 B2 * | 9/2012 | Aarabi | 382/118 |
| 8,290,279 B2 * | 10/2012 | Menadeva et al. | 382/199 |
| 2004/0070666 A1 | 4/2004 | Bober et al. | |
| 2006/0242306 A1 * | 10/2006 | Boro et al. | 709/227 |
| 2007/0097219 A1 * | 5/2007 | Nomura et al. | 348/208.7 |
| 2007/0115349 A1 | 5/2007 | Currivan et al. | |
| 2008/0037836 A1 | 2/2008 | Chen et al. | |
| 2008/0192736 A1 * | 8/2008 | Jabri et al. | 370/352 |
| 2009/0002499 A1 | 1/2009 | Nobuoka | |
| 2009/0202114 A1 * | 8/2009 | Morin et al. | 382/118 |
| 2010/0037170 A1 * | 2/2010 | Poole | 715/772 |
| 2010/0061657 A1 | 3/2010 | Chien | |
| 2010/0103244 A1 * | 4/2010 | Brandsma et al. | 348/14.08 |
| 2010/0215104 A1 * | 8/2010 | Osamoto et al. | 375/240.16 |
| 2011/0141219 A1 * | 6/2011 | Yeh | 348/14.02 |
| 2011/0228047 A1 * | 9/2011 | Markham et al. | 348/43 |

OTHER PUBLICATIONS

PCT International Search Report and Written Opinion (dated Feb. 14, 2011), International Application No. PCT/US2010/059275, International Filing Date Dec. 7, 2010, (12 pages).

* cited by examiner

FACE DETECTION AS A METRIC TO STABILIZE VIDEO DURING VIDEO CHAT SESSION

FIELD

An embodiment of the invention relates to a handheld wireless communication device that can be used to capture videos. Other embodiments are also described.

BACKGROUND

Many handheld wireless communication devices that are in use today provide video capturing capabilities. An example of such a handheld wireless communication device ("device") is a mobile phone that includes a digital camera for capturing still images and videos. With such a device, a user can record a video or conduct a live video chat session with a far-end user.

During a video chat session, the image of the user (typically, the face of the user) is captured by the camera of a near-end device, and then transmitted over the wireless network to a far-end device. The far-end device then displays the image on its screen. At the same time, the image of the far-end user (typically, the face of the far-end user) is captured by the camera of the far-end device, and then transmitted to and displayed on the near-end device. During the video capturing process, any relative movement between the camera and the user can reduce the image quality of the video. For example, if the user is walking or otherwise moving when he talks, the image of his face may be unstable. Further, the user's hand holding the device may be unsteady, which results in unsteady images.

To improve image stability, a user may mount his device on a stable surface, e.g., on top of a desk. However, mounting the device at a fixed location reduces the mobility of the user, as he cannot easily move outside the range of the camera during a video chat session. Further, even if the device is mounted at a fixed location and the user is sitting during a video chat session, the image captured by the device can still be degraded when the user moves his face or body. In some scenarios, the user may post-process the video captured by the device. However, post-processing techniques are not suitable for a live video chat.

SUMMARY

An embodiment of the invention is directed to a handheld wireless communication device that has a camera on the same side of the housing as a display screen. The camera captures a video during a video chat session that is conducted between a user of the handheld communication device and a far-end user. This input video includes images frames, each of the image frames containing an image of a face of the user. A video processor in the device detects the position of the face in each of the image frames. Based on the detected position of the face, a boundary area of each of the image frames is cropped, to produce an output video (while the input video is being captured). The image of the face stays substantially stationary in the output video. The output video is transmitted to the far-end user during the video chat session.

In one embodiment, the video processor calculates a motion vector is calculated as the difference between the detected position of the face in a current image frame and a reference position of the face in a previous image frame. The motion vector indicates the direction and the amount of face movement relative to the reference position. The video processor adjusts the size of the boundary area to be cropped based on the motion vector.

In one embodiment, the boundary area to be cropped from an image frame comprises a top margin, a bottom margin, a right margin and a left margin. The video processor determines the size of the margins in each direction to substantially center the image of the face in the output video. In another embodiment, the handheld communication device provides one or more options for the user to select a fixed position in the output frames of the output video as the position of the face. The selectable fixed location may be anywhere in the output frames as desired by the user.

In one embodiment, when the amount of face movement exceeds the available margin in any of the top, bottom, right and left directions, the handheld communication device generates a visual or audio warning to alert the user. When this occurs, the user can adjust the position of the handheld communication device or adjust the position of the face, to, for example, re-center the face image.

The handheld communication device may be configured or programmed by its user to support one or more of the above-described features.

The above summary does not include an exhaustive list of all aspects of embodiments of the present invention. It is contemplated that embodiments of the invention include all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
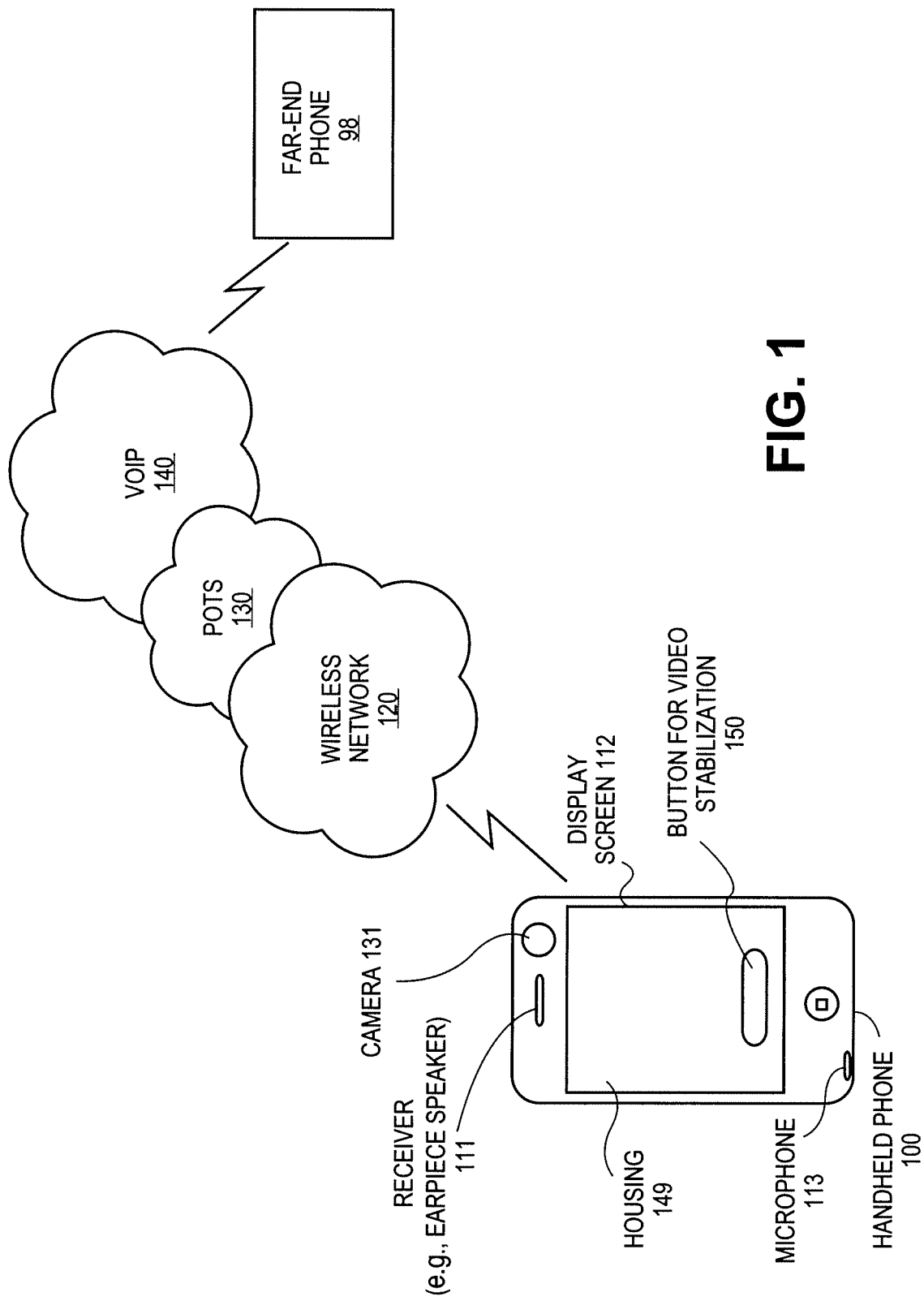
FIG. 1 is a diagram of one embodiment of a handheld communication device in accordance with an embodiment of the invention.

FIG. 1 is a diagram illustrating a communication environment in which an embodiment of the invention can be practiced, using a handheld phone 100. The term "phone" herein broadly refers to various two-way, real-time communication devices, e.g., landline plain-old-telephone system (POTS) end stations, voice-over-IP (VOIP) end stations, cellular handsets, smart phones, personal digital assistant (PDA) devices, etc. In one embodiment, the handheld phone 100 can support a two-way, real-time mobile or wireless connection. For example, the handheld phone 100 can be a mobile phone or a mobile multi-functional device that can both send and receive the uplink and downlink video signals for a video call.

The handheld phone 100 communicates with a far-end phone 98 over one or more connected communication networks, for example, a wireless network 120, POTS network 130, and a VOIP network 140. Communications between the handheld phone 100 and the wireless network 120 may be in accordance with known cellular telephone communication network protocols including, for example, global system for mobile communications (GSM), enhanced data rate for GSM evolution (EDGE), and worldwide interoperability for microwave access (WiMAX). The handheld phone 100 may also have a subscriber identity module (SIM) card, which is a detachable smart card that contains the subscription information of its user, and may also contain a contacts list of the user. The user may own the handheld phone 100 or may otherwise be its primary user. The handheld phone 100 may be assigned a unique address by a wireless or wireline telephony network operator, or an Internet Service Provider (ISP). For example, the unique address may be a domestic or international telephone number, an Internet Protocol (IP) address, or other unique identifier.

The exterior of the handheld phone 100 is made of a housing 149 within which are integrated several components including a display screen 112, a receiver 111 (e.g., an earpiece speaker for generating sound) and a microphone (e.g., a mouthpiece for picking up sound). The handheld phone 100 may also include one or more cameras, with a camera 131 located on the same side as the display screen 112. In an alternative embodiment, the camera 131 may be located on a different side from the display screen 112. The videos and sounds captured by the handheld phone 100 may be stored internally in the memory of the handheld phone 100 for viewing at a later time, or transmitted in real-time to the far-end phone 98 during a video chat session.

The handheld phone 100 also includes a user input interface for receiving user input. In one embodiment, the user input interface includes a button 150 for activating a video stabilization mechanism. The button 150 may be a physical button or a virtual button. The physical button may be a dedicated button, or one or more buttons identified by text shown in one or more selection menus on the display screen 112 (e.g., "press 2 to start a video chat" and "press 1 to activate video stabilization"). In an embodiment where the button 150 is a virtual button, the virtual button may be implemented on a touch-sensing panel that includes sensors to detect touch and motion of the user's finger. In one embodiment, the touch-sensing panel can be embedded within the display screen 112, e.g., as part of a touch sensor. In an alternative embodiment, the touch-sensing panel can be separate from the display screen 112, and can be used by the user to direct a pointer on the display screen 112 to select a graphical button shown on the display screen 112.

In one embodiment, when the handheld phone 100 starts a video chat session, a user can activate the video stabilization mechanism to automatically adjust the images in the video such that the face of the user remains substantially stationary. In a video chat session, the main subject of the video transmitted to the far-end phone 98 is the user's face. However, due to the relative movement of the phone and the user, the face of the user in the captured image frames (also referred to as "captured frames") may be unstable. The video stabilization mechanism provided by the handheld phone 100 stabilizes the face of the user in each of the out image frames (also referred to as "output frames") that are transmitted to the far-end phone 98. For example, the face of the user may remain centered in each output frame without any noticeable movement.

Turning to the far-end phone 98, the far-end phone 98 may be a mobile device or a land-based device that is coupled to a telephony network or other communication networks through wires or cables. The far-end phone 98 may be identified with a unique address, such as a telephone number within the public switched telephone network. The far-end phone 98 may also have an Internet protocol (IP) address if it performs calls through a VOIP protocol. The far-end phone 98 may be a cellular handset, a plain old telephone service (POTS), analog telephone, a VOIP telephone station, or a desktop or notebook computer running telephony or other communication software. The far-end phone 98 has the capabilities to view videos captured by and transmitted from the handheld phone 100.

Figure 2:
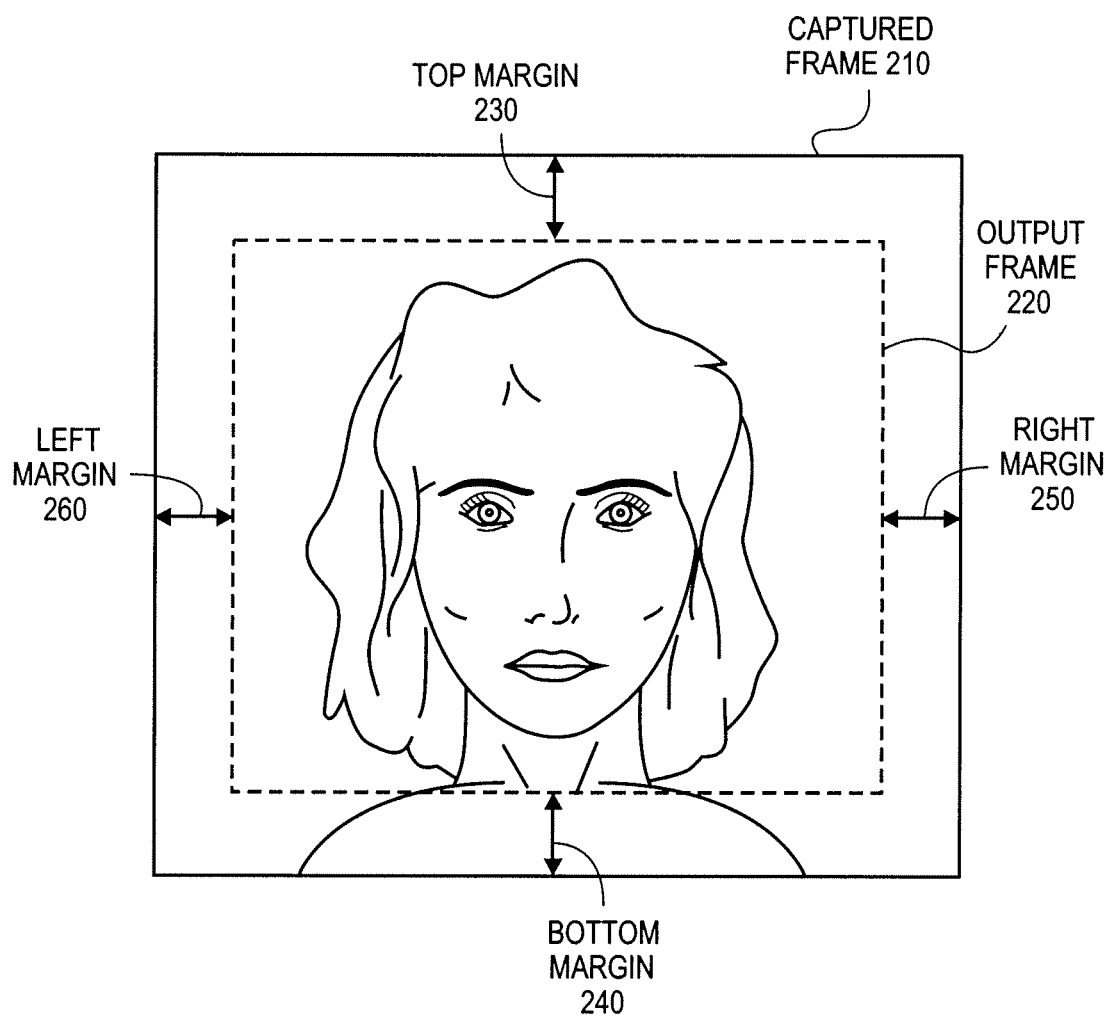
FIG. 2 is an example illustrating an image frame captured by the handheld communication device and its corresponding output frame.

FIG. 2 is a diagram illustrating an example of a captured frame 210 and its corresponding output frame 220 when the video stabilization mechanism of the handheld phone 100 is activated. The captured frame 210 is an image frame captured by the handheld phone 100, and the output frame is a corresponding stabilized image frame to be transmitted to the far-end phone 98. The size of the captured frame 210 is generally determined by the pixel counts of the image produced by the camera 131. The size of the output frame 220 can be determined by the size of the display screen 112 or a size chosen by the user. The captured frame 210 contains an image of a face (also referred to as "a face"). In one embodiment, the handheld phone 100 implements a face detection technique to detect the position of the face in the captured frame 210. During the course of a video chat session, the face of the user is detected in each captured frame and stabilized in each output frame. The face detection technique is capable of detecting a region in an image where a face is located. The shape of the region may a rectangle or other simple geometric shapes and the size of the region approximates the size of the face. When the video stabilization mechanism is activated, the handheld phone 100 may crop the boundary of the captured frame 210 in real time (i.e., during the video chat session) to produce the corresponding output frame 220, such that the face is at a pre-determined fixed position of the output frame 220 (e.g., the center). The output frame 220, which is part of a stabilized video, can be transmitted to the far-end phone 98 during a real-time video chat. In one embodiment, the handheld phone 100 can transmit the stabilized video to the far-end phone 98 simultaneously with the display of the video that is received from the far-end phone 98 on the displayed screen 112.

For example, at the beginning of a video chat session, the handheld phone 100 may automatically detect a position of the face in the captured frame. The handheld phone 100 then sets a window area over the captured frame such that the face is positioned at a fixed location in the output frame. An example of the fixed position of the face may be the center of the output frame. More specifically, the center of an output frame may refer to a center pixel coordinate of the output frame. For example, for an output frame of 720×480 pixels, the center of the output frame can be defined as the pixel coordinate of (360, 240). The window area defines the size the output frame 220, and the pixels outside the window area are the boundary area to be cropped.

In an alternative embodiment, the user may modify the fixed position of his face in the output frame by shifting the window area over the captured frame. For example, if the user wants to include a friend sitting next to him in the video chat session, the user's face may not be exactly centered in the output frames. In this example, at the beginning of or during the video chat session, the user may activate an "adjust face position" option on the handheld phone 100 to select or adjust the fixed position of the user's face in the output frames. The "adjust face position" option may be provided by the user interface of the handheld phone 100, e.g., with one or more physical or virtual buttons. The "adjust face position" option overrides a default face position, e.g., the center of the output frame. With the activation of the "adjust image position" option, the user may be provided with further options to move the window area, such that the output frames can be adjusted to include his face and his friend's face side by side. In one embodiment, the handheld phone 100 may provide shift-up, shift-down, shift-right and shift-left keys for the user to move the window area to a suitable location. Once the position of the window area is determined, the handheld phone 100 may record the position of the window area and then crop the boundary area (i.e., the region outside the window area) to produce an output frame. The position of the user's face in the captured image frame is also recorded as a reference position. The handheld phone 100 can use this reference position to determine movement of the face and to adjust the position of the window area in the subsequent frames.

In one embodiment, after the "adjust image position" operation is completed, the handheld phone 100 may switch off the display of the output frames, and display the video received from the far-end phone 98 on the display screen 112. In another embodiment, the handheld phone 100 may display both of the output frames and the video received from the far-end phone 98 on a split display screen or using a picture-in-picture function.

In the example of FIG. 2, the handheld phone 100 centers the face in the output frame 220 by cropping a boundary area that includes a top margin 230, a bottom margin 240, a right margin 250 and a left margin 260. The size of the margin in each direction defines the amount of the face movement in that direction that can be accommodated by the captured frame 210. For example, the right margin 250 of 0.5 inches allows the face to move to the right by 0.5 inches in a next captured frame. A bottom margin 240 of 0.3 inches allows the face to move downward by 0.3 inches in the next captured frame. If a movement of the face in one direction exceeds the available margin in that direction, the handheld phone 100 may show a warning indicator on the display screen 112 or generate a warning audio signal. The user may respond to the warning by adjusting the position of the handheld phone 100 or by moving the position of his face. Before the user is able to respond, the video chat session may continue without an interruption perceivable by the far end. In one embodiment, the video chat session may continue to maintain the user's face substantially at the center of the output frame while part of the boundary rows or columns are temporarily blanked out to compensate for the excessive movement. In another embodiment, the video chat session may continue but will not lock onto the face. That is, the face stabilization mechanism may be temporarily de-activated until the handheld phone 100 is able to re-stabilize the face.

Figure 3:
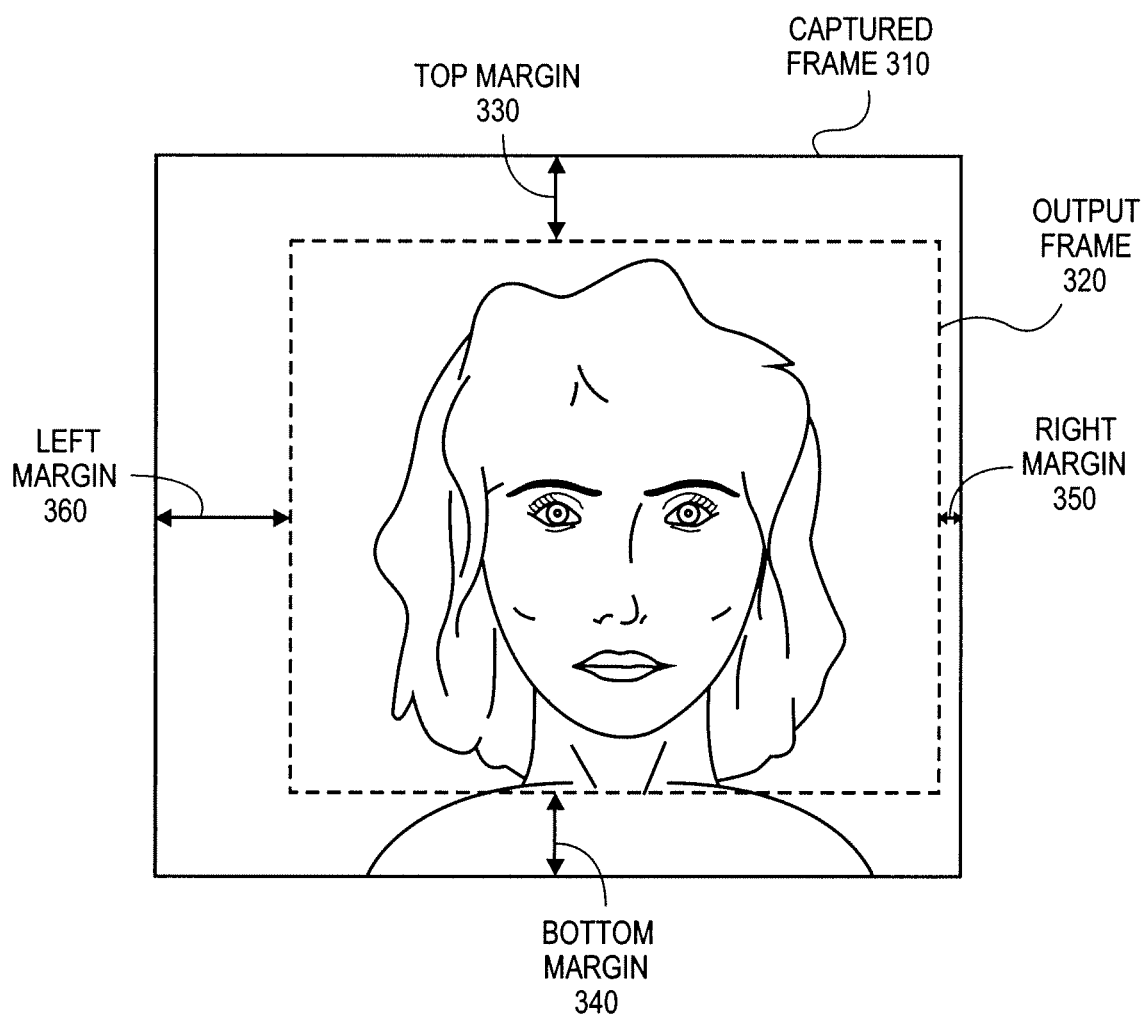
FIG. 3 is an example illustrating another image frame, in which the face of a user has moved from the position in a previous image frame, and its corresponding output frame.

FIG. 3 illustrates one example of a captured frame 310 and a corresponding output frame 320 when the face is moved to the right of the captured frame 310. The corresponding output frame 320 may be obtained by cropping the same amount of a top margin 330 and a bottom margin 340 as shown in FIG. 2. However, in this scenario, a larger left margin 360 and a smaller right margin 350 are cropped (as compared to FIG. 2) to adjust the position of the face to the center of the output frame 320. Similar operations can be performed when the face moves upwards, downwards, to the left, or a combination of upwards, downward, right and left. Thus, the face in an image frame can move in any direction and the effect of the movement can be canceled out in the corresponding output frame.

The video stabilization technique described herein can be used to cancel out any relative movement between the camera 131 and the face, within the limit set by the sizes of the margins. In one scenario, the face may be swaying from side to side or the hand holding the handheld phone 100 may be unsteady. With the activation of video stabilization, the stabilized video may show the face staying substantially stationary in each output frame, thus cancelling the effect of any movement that can cause unsteady images in the video. In another scenario, the user of the handheld phone 100 can be walking down a street as she is engaging in a video chat. With the activation of video stabilization, the stabilized video may show the face staying substantially stationary in each output frame with changing backgrounds. In either scenario, the handheld phone 100 is capable of dynamically adjusting the margins of the captured image frames and cropping the adjusted margins in real time during a video chat to stabilize the video.

Figure 4:
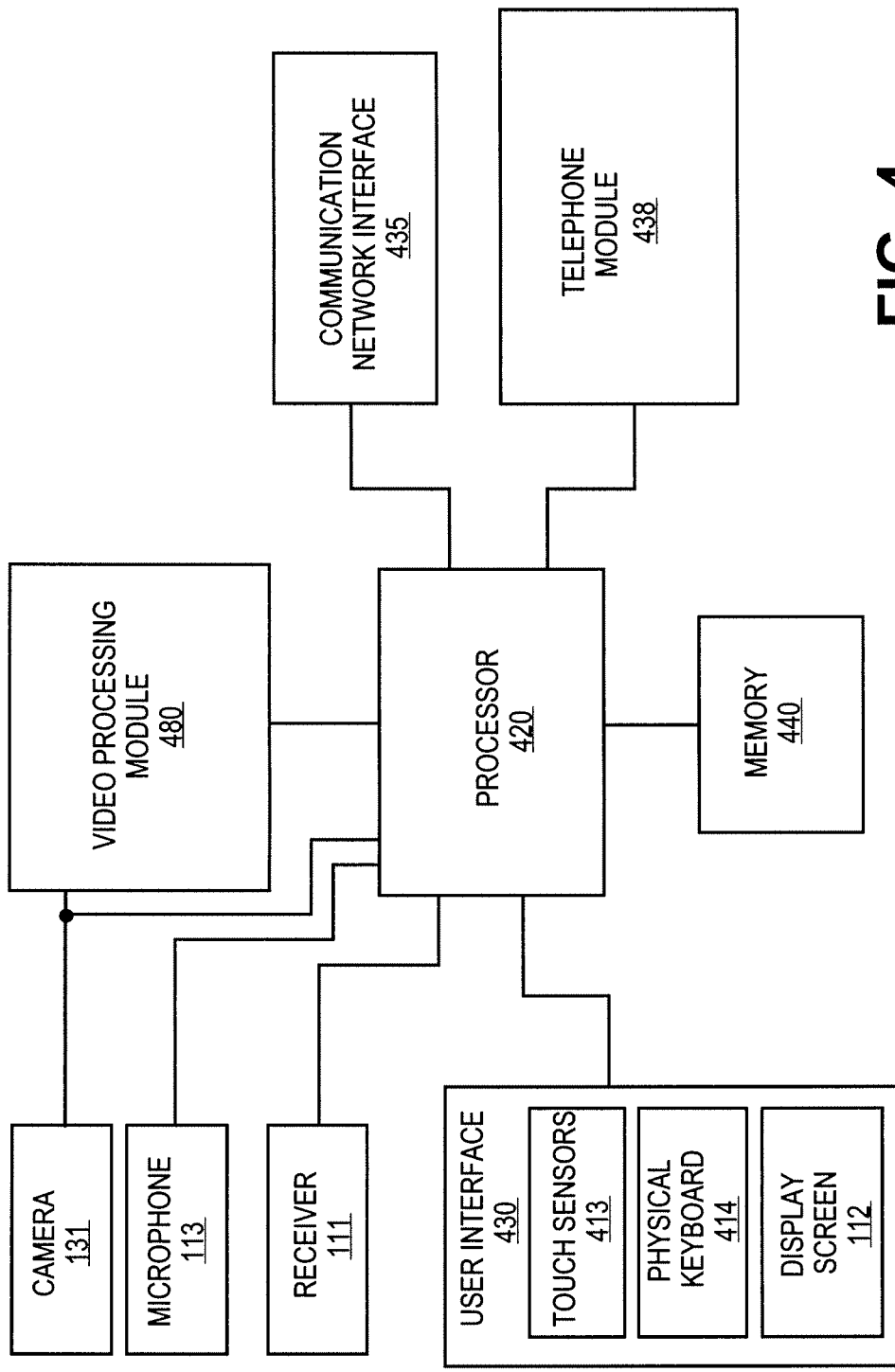
FIG. 4 is a diagram of functional unit blocks in the handheld communication device that provide video capture, stabilization and transmission capabilities.

FIG. 4 is a block diagram illustrating an embodiment of the handheld phone 100. The handheld phone 100 includes a communication network interface 435 for receiving and transmitting communication signals, e.g., audio, video and/or data signals. The handheld phone 100 also includes the receiver 111 for generating audio signals and the microphone 113 for picking up sound. The handheld phone 100 also includes a user interface 430. The user interface 430 includes the display screen 112 and touch sensors 413 for sensing the user's touch and motion. The handheld phone 100 may include a physical keyboard 414 for receiving keystrokes input from the user, or a virtual keyboard implemented by the touch sensors 413. The touch sensors 413 may be based on resistive sensing, capacitive sensing, optical sensing, force sensing, surface acoustic wave sensing, and/or other sensing techniques. The coordinates of the touch sensors 413 that respond to the user's touch and motion represent a specific user input. The touch sensors 413 may be embedded in the display screen 112, or may be embedded in a touch-sensing panel separate from the display screen 112.

In one embodiment, the handheld phone 100 also includes a telephone module 438 which is responsible for coordinating various tasks involved in a phone call. The telephone module 438 may be implemented with hardware circuitry, or may be implemented with one or more pieces of software or firmware that are stored within memory 440 in the handheld phone 100 and executed by the processor 420. Although one processor 420 is shown, it is understood that any number of processors or data processing elements may be included in the handheld phone 100. The telephone module 438 coordinates tasks such as receiving an incoming call signal, placing an outgoing call and processing the request for a video chat session.

In one embodiment, the handheld phone 100 also includes a video processing module 480 to perform video stabilization on captured video in real time. The video processing module 480 receives the captured video including a sequence of captured frames from the camera 131, and processes the captured frames to generate a stabilized video for transmission via the communication network interface 435 to the far-end phone 98. The video processing module 480 may be implemented with hardwired logic circuitry, or may be implemented with one or more pieces of software or firmware that are stored within the memory 440 and that are executed by (or program)

the processor 420 to perform the same functions as the hardwired logic. The video processing module 480 will be described in greater detail with reference to FIG. 5.

Additional circuitry, including a combination of hardwired logic circuitry, other circuitry, and software that programs one or more processors, can be included to obtain the needed functionality described herein. These are not described in detail as they would be readily apparent to those of ordinary skill in the art of mobile phone circuits and software.

Figure 5:
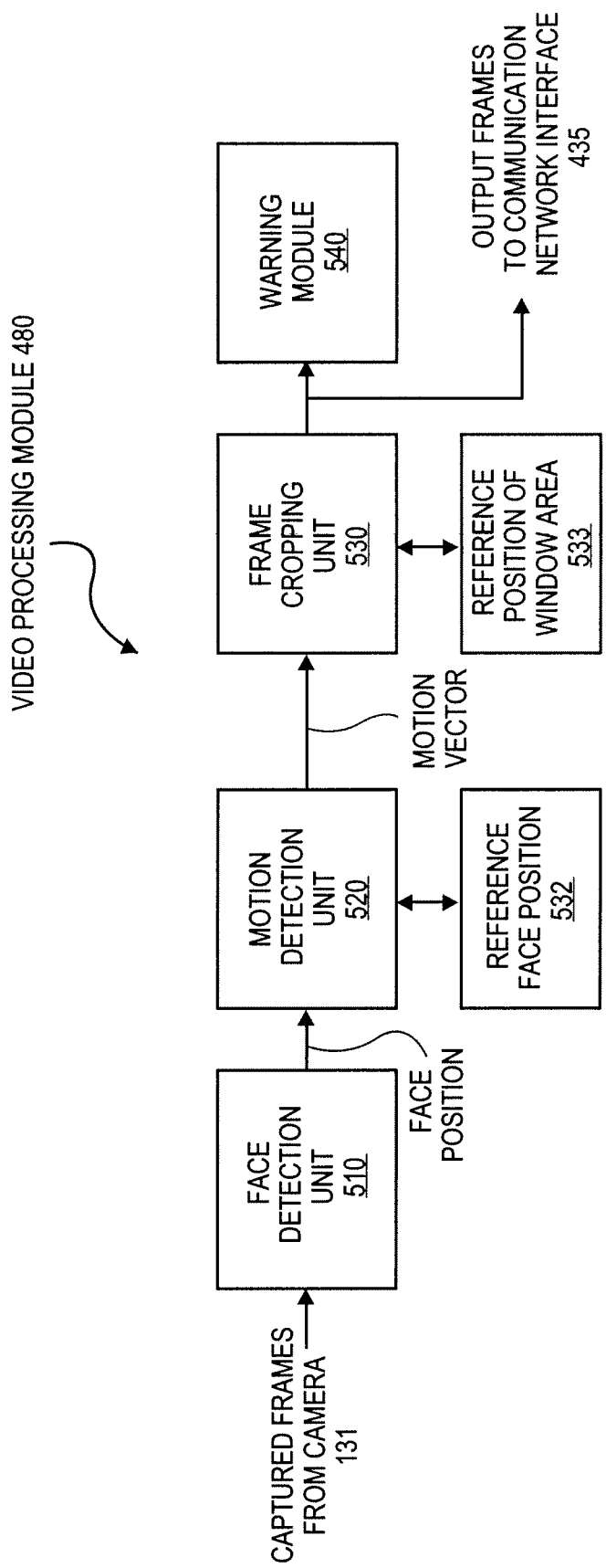
FIG. 5 is a block diagram of a video processing module in the handheld communication device.

FIG. 5 is a block diagram illustrating an embodiment of the video processing module 480, which processes a captured video to produce a stabilized video. The video processing module 480 includes a face detection unit 510, a motion detection unit 520, a frame cropping unit 530 and a warning module 540. The face detection unit 510 detects a face in each captured frame using one or more known face detection techniques. The motion detection unit 520 compares the current position of the face (e.g., the center of the region identified as containing the face by the face detection techniques) in the captured frame with a reference face position 532. The reference face position 532 may be the position of the face in a previously captured frame (e.g., an immediately preceding captured frame, an initial captured frame recorded at the beginning of the video chat session, or any other previously captured frame). The handheld phone 100 can use any previously captured frame to provide the reference face position 532, as long as the handheld phone 100 has also recorded the position of its corresponding window area ("reference position of window area" 533). The handheld phone 100 then calculates a motion vector, which is the difference between the current face position and the reference face position 532. The motion vector measures in what direction and how much the window area needs to be shifted to stabilize the face. The area outside the window area defines the boundary area to be cropped.

After the motion vector is calculated, in one embodiment, the frame cropping unit 530 determines the amount of the boundary area in the captured image frame to be cropped. For example, a motion vector that points upwards with a magnitude of ten pixels (or in other units of measurement) indicates that the position of the face has shifted ten pixels upwards. Thus, the position of the corresponding window area also needs to be shifted upwards by ten pixels. The frame cropping unit 530 then crops the top of the image frame ten fewer pixels and crops the bottom ten additional pixels, as compared with the reference position of the window area 533. If the top margin of the image frame is not wide enough to shift the face down, the warning module 540 may generate a visual or audible warning signal to the user. Upon receiving the warning, the user may adjust the position of the face or the position of the camera 131.

In one embodiment, after the boundary area of the captured frame is cropped, the resulting output frame is sent to the communication network interface 435. The output frames with its associated audio signals is then forwarded by the communication network interface 435 to the far-end phone 98 as part of the stabilized video transmitted in a video chat session.

Figure 6:
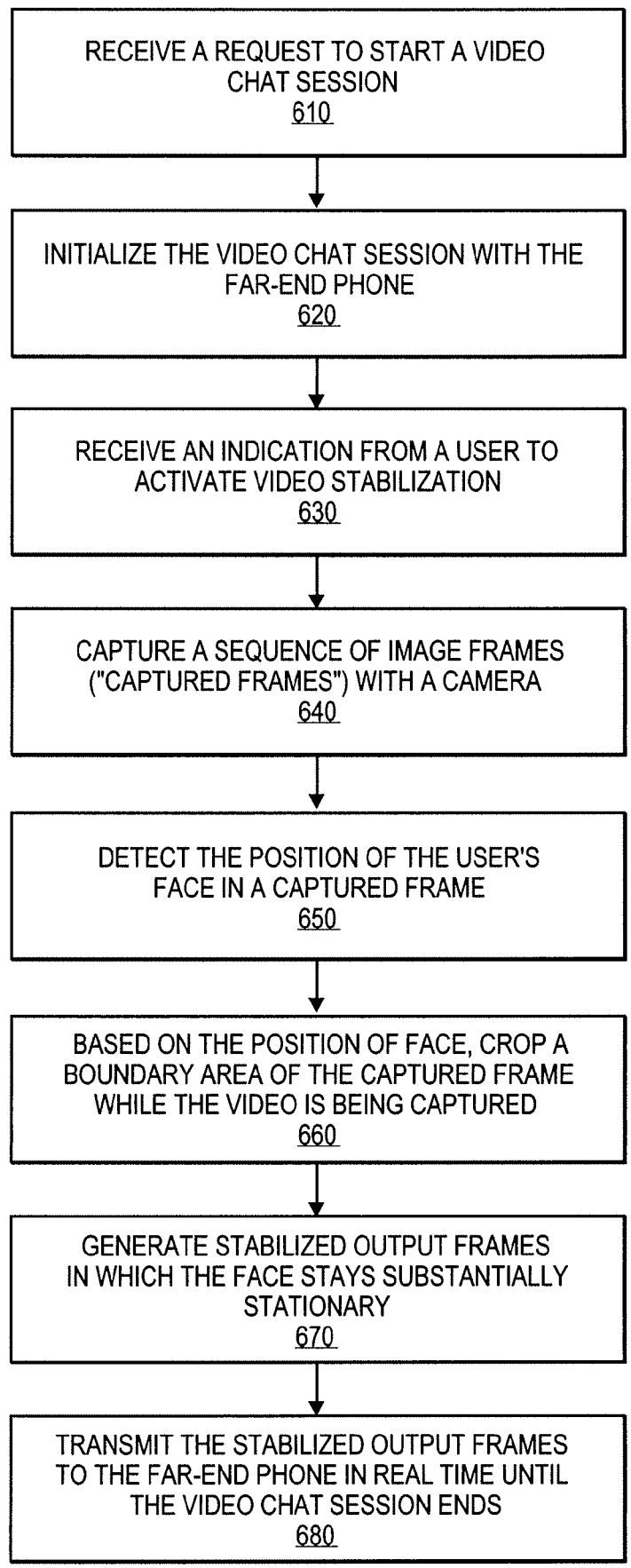
FIG. 6 is a flow chart illustrating an embodiment of a method for video stabilization.

FIG. 6 is a flowchart that illustrates an embodiment of a method for operating the handheld phone 100 to perform video stabilization. Referring to FIG. 6, operation may begin when the handheld phone 100 receives a request to start a video chat session (610). The request may be initiated by the handheld phone 100 or by the far-end phone 98. The handheld phone 100 then initializes the video chat session with the far-end phone 98 (620).

The handheld phone 100 may receive an indication from its user to activate video stabilization prior or during the video chat session (630). In one embodiment, the user may activate video stabilization using the button 150 of FIG. 1, at the beginning or during the video chat session. In an alternative embodiment, the user may pre-configure the handheld phone 100 to activate video stabilization prior to the video chat session.

During the video chat session, the handheld phone 100 captures a sequence of image frames ("captured frames") using the camera 131 (640), with each captured frame containing the image of a face. The handheld phone 100 detects the position of the face in a captured frame (650). Based on the position of the face, a boundary area of the captured frame is cropped while the video is being captured (660). The cropped image frame is an output frame of a stabilized video.

The handheld phone 100 performs face detection and image cropping operations in real time during the video chat session, without the need of post processing at the near end. As a result, the handheld phone 100 produces stabilized output frames in which the face stays substantially stationary (670). The stabilized output frames are transmitted to the far-end phone 98 in real time until the video chat session ends (680).

In general, the handheld phone 100 (e.g., the telephone module 438 and/or the video processing module 480 of FIGS. 4 and 5) may be configured or programmed by the user to support one or more of the above-described features.

To conclude, various ways of stabilizing a video based on face detection using a handheld phone (e.g., a wireless handheld communication device, a mobile phone, etc.) have been described. These techniques improve image quality in a video captured and transmitted in a video chat session. As explained above, an embodiment of the invention may be a machine-readable storage medium (such as memory 440) having stored thereon instructions which program a processor to perform some of the operations described above. In other embodiments, some of these operations might be performed by specific hardware components that contain hardwired logic. Those operations might alternatively be performed by any combination of programmed data processing components and custom hardware components.

The invention is not limited to the specific embodiments described above. Accordingly, other embodiments are within the scope of the claims.

What is claimed is:

1. A method for operating a handheld communication device, the method comprising:
    capturing a video during a video chat session conducted between a user of the handheld communication device and a far-end user, the video captured with a camera integrated within a housing of the handheld communication device, the video comprising a plurality of images frames, each of the image frames containing an image of a face of the user;
    based on a detected position of the face in each image frame, cropping a boundary area of the image frame to produce an output video such that the image of the face stays substantially stationary in the output video;
    displaying the output video via a display device integrated within the housing on a common side of the device as the camera, and
    transmitting the output video to the far-end user during the video chat session.

2. The method of claim 1, further comprising:
maintaining the image of the face at a user-selectable fixed position in each of a plurality of output frames of the output video.

3. The method of claim 1, further comprising:
for each image frame, calculating a motion vector between the detected position of the face and a reference position of the face; and
determining the boundary area to be cropped based on the motion vector.

4. The method of claim 1, further comprising:
determining whether a size of the boundary area to be cropped exceeds an available margin; and
in response to a determination that the size of the boundary area exceeds the available margin, generating a warning to the user.

5. The method of claim 1, further comprising:
maintaining the image of the face substantially stationary in the output video while the user is moving.

6. The method of claim 1, further comprising:
receiving and displaying a video transmitted from the far-end user while the output video is transmitted to the far-end user during the video chat session.

7. A method for operating a handheld communication device, the method comprising:
capturing a video during a video chat session conducted between a user of the handheld communication device and a far-end user, the video captured with a camera integrated within a housing of the handheld communication device, the video comprising a plurality of images frames, each of the image frames containing an image of a face of the user;
based on a detected position of the face in each image frame, cropping a boundary area of the image frame to produce an output video such that the image of the face stays substantially stationary in the output video; wherein the boundary area comprises a top margin, a bottom margin, a right margin and a left margin, the cropping comprising determining a size of each of the top margin, the bottom margin, the right margin and the left margin to substantially center the image of the face in the output video; and
transmitting the output video to the far-end user during the video chat session.

8. A handheld communication device comprising:
a camera to capture a video during a video chat session conducted between a user of the handheld communication device and a far-end user, the video comprising a plurality of images frames, each of the image frames containing an image of a face of the user;
a single housing within which the camera is integrated on a same side as a display screen;
a video processing module within the single housing to detect a position of the face in each image frame, to determine a window area in each image frame based on a detected position of the face, and to crop margins outside the window area during the video chat session, to produce an output video in which the image of the face stays substantially stationary; and
a communication network interface to transmit the output video to the far-end user during the video chat session.

9. The handheld communication device of claim 8, further comprising:
a user interface that provides one or more options for the user to select a fixed position in an output frame as the position of the face in the output video.

10. The handheld communication device of claim 8, wherein the video processing module comprises:
a frame cropping unit to determine a size of the margins, which include a top margin, a bottom margin, a right margin and a left margin, to substantially center the image of the face in the output video.

11. The handheld communication device of claim 8, wherein the video processing module comprises:
a motion detection unit to calculate a motion vector between the detected position of the face in a current image frame and a reference position of the face in a previous image frame.

12. The handheld communication device of claim 8, wherein the video processing module comprises:
a warning module to generate a warning to the user when a movement of the face in one of the image frames exceeds an available margin.

13. The handheld communication device of claim 8, further comprising:
a display screen to display a received video from the far-end user while the output video is transmitted to the far-end user during the video chat session.

14. An article of manufacture comprising a machine-readable storage medium having stored therein instructions that program a handheld communication device to
capture, with a camera integrated within a housing of the handheld communication device, a video during a video chat session conducted between a user of the handheld communication device and a far-end user, the video comprising a plurality of images frames, each of the image frames containing an image of a face of the user;
for each image frame, determine a position of a window that contains the image of the face such that the image of the face stays substantially stationary within the window area;
for each image frame, crop a boundary area defined by areas outside the window to produce an output frame of an output video; and
display, by a display device integrated within the housing on a common side of the device as the camera, the output video, and
transmit the output video to the far-end user during the video chat session.

15. The article of manufacture of claim 14, wherein the instructions further program the communication device to
maintain the image of the face at a user-selectable fixed position in each of a plurality of output frames of the output video.

16. The article of manufacture of claim 14, wherein the instructions further program the communication device to
calculate a motion vector between a detected position of the face and a reference position of the face; and determine the boundary area to be cropped based on the motion vector.

17. The article of manufacture of claim 14, wherein the instructions further program the communication device to
generate a warning to the user when the movement of the face exceeds an available margin.

18. The article of manufacture of claim 14, wherein the instructions further program the communication device to
maintain the image of the face substantially stationary in the output video while the user is moving.

19. The article of manufacture of claim 14, wherein the instructions further program the communication device to
receive and display a video received from the far-end user while the output video is transmitted to the far-end user during the video chat session.

20. An article of manufacture comprising a machine-readable storage medium having stored therein instructions that program a handheld communication device to
- capture, with a camera integrated within a housing of the handheld communication device, a video during a video chat session conducted between a user of the handheld communication device and a far-end user, the video comprising a plurality of images frames, each of the image frames containing an image of a face of the user;
- for each image frame, determine a position of a window that contains the image of the face such that the image of the face stays substantially stationary within the window area;
- for each image frame, crop a boundary area defined by areas outside the window to produce an output frame of an output video by determining a size of the boundary area, which includes a top margin, a bottom margin, a right margin and a left margin, to substantially center the image of the face in the output video; and
- transmit the output video to the far-end user during the video chat session.

* * * * *